US009017067B2

(12) United States Patent
Cao et al.

(10) Patent No.: US 9,017,067 B2
(45) Date of Patent: Apr. 28, 2015

(54) OXYGEN ENRICHMENT OF PREMIX AIR-GAS BURNERS

(75) Inventors: Jin Cao, Orefield, PA (US); Aleksandar Georgi Slavejkov, Allentown, PA (US); Shailesh Pradeep Gangoli, Easton, PA (US); Jeffrey D. Cole, Nazareth, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 697 days.

(21) Appl. No.: 13/396,657

(22) Filed: Feb. 15, 2012

(65) Prior Publication Data
US 2013/0052597 A1 Feb. 28, 2013

Related U.S. Application Data

(60) Provisional application No. 61/443,315, filed on Feb. 16, 2011.

(51) Int. Cl.
*F23L 7/00* (2006.01)
*F23D 14/32* (2006.01)

(52) U.S. Cl.
CPC .............. *F23D 14/32* (2013.01); *F23C 2201/20* (2013.01); *F23C 2900/06043* (2013.01); *F23D 2203/1012* (2013.01); *F23D 2900/00008* (2013.01); *F23L 2900/07007* (2013.01); *Y02E 20/344* (2013.01)

(58) Field of Classification Search
CPC ....................................................... F23L 7/00

USPC .......... 431/354, 12, 2, 353, 187, 10; 110/264, 110/261, 347, 204
See application file for complete search history.

(56) References Cited

U.S. PATENT DOCUMENTS

| 2,857,148 | A | * | 10/1958 | Niemitz ........................... 432/20 |
| 4,679,512 | A | * | 7/1987 | Skoog ............................ 110/347 |
| 5,199,866 | A | | 4/1993 | Joshi et al. |
| 5,256,058 | A | | 10/1993 | Slavejkov et al. |
| 5,496,170 | A | * | 3/1996 | Primdahl et al. ............... 431/187 |
| 5,575,637 | A | * | 11/1996 | Slavejkov et al. ................. 431/8 |
| 5,611,682 | A | * | 3/1997 | Slavejkov et al. ................. 431/8 |
| 6,196,142 | B1 | * | 3/2001 | Ohlsen ........................... 110/264 |
| 6,659,762 | B2 | * | 12/2003 | Borders et al. ..................... 431/8 |
| 8,696,348 | B2 | * | 4/2014 | Cao et al. ........................... 431/8 |

(Continued)

FOREIGN PATENT DOCUMENTS

EP 1850067 A2 10/2007
WO 03021015 A1 3/2003

(Continued)

*Primary Examiner* — Gregory Huson
*Assistant Examiner* — Nikhil Mashruwala
(74) *Attorney, Agent, or Firm* — Michael K. Boyer; Larry S. Zelson

(57) ABSTRACT

A premix burner arrangement for safely oxygen-enriching a premix air-fuel combustion system is disclosed. In the disclosed burner arrangement, a first conduit is arranged and disposed to provide a first gas stream. The first gas stream is a self-reactive or self-flammable premixture comprising air and a combustible gas. At least one second conduit is arranged and disposed to provide a second gas stream circumferentially around the first gas stream. The second gas stream includes oxygen. The premix burner arrangement is configured to combust or react the first stream at a temperature at least 1000° F. greater than the temperature of the second stream. A method and combustion system including the premix burner arrangement are also disclosed.

20 Claims, 3 Drawing Sheets

(56) References Cited

U.S. PATENT DOCUMENTS

2010/0077944 A1 4/2010 Slavejkov et al.
2010/0167219 A1* 7/2010 Richardson ................. 431/8

FOREIGN PATENT DOCUMENTS

| WO | WO 2008/005460 A2 * | 1/2008 |
| WO | 2011005702 A1 | 1/2011 |

* cited by examiner

OXYGEN ENRICHMENT OF PREMIX AIR-GAS BURNERS

This Application claims the benefit of U.S. Provisional Application No. 61/443,315, filed on Feb. 16, 2011. The disclosure of the Provisional Application is hereby incorporated by reference.

BACKGROUND OF THE INVENTION

The subject matter of the present invention relates to a premix burner arrangement and method for adding, enriching, or increasing the overall concentration of oxygen when combusting a mixture of air and a combustible gas such as natural gas.

Industrial furnace heating applications often employ burners operating with premixed air and fuel (e.g. Natural Gas). The reactants can be premixed, for example, at the stoichiometric ratio, which is sufficient for complete combustion. The main reasons for premixing fuel and air are: (i) simplicity and cost savings; only one pipe to the burner is needed instead of two for nozzle mixed burners; (ii) air-fuel flames are generally difficult to stabilize, especially in cold furnaces, so pre-mixing helps with flame stability.

Premix air-fuel combustion is very difficult to enrich with oxygen. This is due to the potential of flame flashback and burner damage, if significant additional oxygen was added directly to the mixture of air and fuel. The potential of flashback has limited direct addition of oxygen to premix combustion mixtures to a relatively low level enrichment, e.g. 23% O2.

There are situations when combustion improvements are needed, such as for production increase, quality improvement, or fuel savings, where significant oxygen enrichment of such burners is considered. However, oxygen enrichment of premix air-fuel burners is not a simple matter. Additional oxygen is not directly "premixed" with the fuel because the speed of an oxy-fuel flame usually travels faster than the velocity of the "premix flow". This results in a "flashback", i.e., flame travels back through the premix flow pipe to the source of mixing increasing the potential of explosion. The flame speed is generally much lower for the air-fuel case which enables the premix type of operation.

U.S. Pat. No. 5,256,058, which is hereby incorporated by reference in its entirety, discloses an oxy-fuel burner that employs a precombustor between a burner and a process furnace. U.S. Pat. No. 5,199,866, which is hereby incorporated by reference in its entirety, discloses an adjustable oxy-fuel burner. Neither of these patents discloses a premix gas mixture, nor the low velocity injection of oxygen circumferentially around a central gas stream.

A premix burner arrangement, a combustion system, and method for enriching combustion of a pre-mixture of air and a combustible gas with significant additional oxygen that is safe, efficient and reduces or eliminates overheating of the burner components would be desirable in the art.

BRIEF SUMMARY OF THE INVENTION

The present invention can solve problems associated with conventional burners by providing a burner design and method for introducing significant additional oxygen to a previously formed mixture (or pre-mix) of air and a combustible gas. The invention enables higher levels of oxygen-enrichment of premix combustion in a safe and efficient manner within the burner confinements. The invention also employs a method for introducing oxygen-flow into the burner system to minimize overheating of the burner components (e.g., refractory block for mounting the burner to a furnace wall).

One aspect of the invention relates to a premix burner arrangement. The premix burner arrangement includes a first conduit arranged and disposed to provide a first gas stream. The first gas stream is a self-reactive or self-flammable pre-mixture comprising air and a combustible gas. At least one second conduit is arranged and disposed to provide a second gas stream circumferentially around the first gas stream. The second gas stream includes oxygen. The premix burner arrangement is configured to combust or react the first stream at a temperature at least 1000° F. greater than the temperature of the second stream. The premix burner arrangement is further configured to provide a velocity ratio of the second gas stream to the first gas stream sufficiently low to inhibit mixing of the first gas stream with the second gas stream.

Another aspect of the invention relates to a combustion method. The combustion method includes providing a first gas stream. The first gas stream is a self-reactive or self flammable pre-mixture comprising air and a combustible gas in a first conduit. The method further includes providing a second gas stream circumferentially around the first gas stream with at least one second conduit. The second gas stream includes oxygen. The first gas stream reacts or combusts and is at a temperature at least 1000° F. higher than the second stream. The first gas stream and the second gas stream are provided with a velocity ratio of the second gas stream to the first gas stream sufficiently low to inhibit mixing of the first gas stream with the second gas stream.

Another aspect of the invention relates to a combustion system. The combustion system includes a premix burner arrangement having a first conduit and at least one second conduit. The first conduit is arranged and disposed to provide a first gas stream. The first gas stream is a self-reactive or self-flammable pre-mixture comprising air and a combustible gas. The at least one second conduit is arranged and disposed to provide a second gas stream including oxygen circumferentially around the first gas stream. The combustion system further includes a burner block forming a precombustion zone configured to receive the first gas stream and the second gas stream. The premix burner arrangement is configured to combust or react the first stream at a temperature at least 1000° F. greater than the temperature of the second stream. The premix burner arrangement is further configured to provide a velocity ratio of the second gas stream to the first gas stream sufficiently low to inhibit mixing of the first gas stream with the second gas stream.

Other features and advantages of the present invention will be apparent from the following more detailed description of the preferred embodiment, which illustrates, by way of example, the principles of the invention.

DETAILED DESCRIPTION OF THE INVENTION

Figure 1:
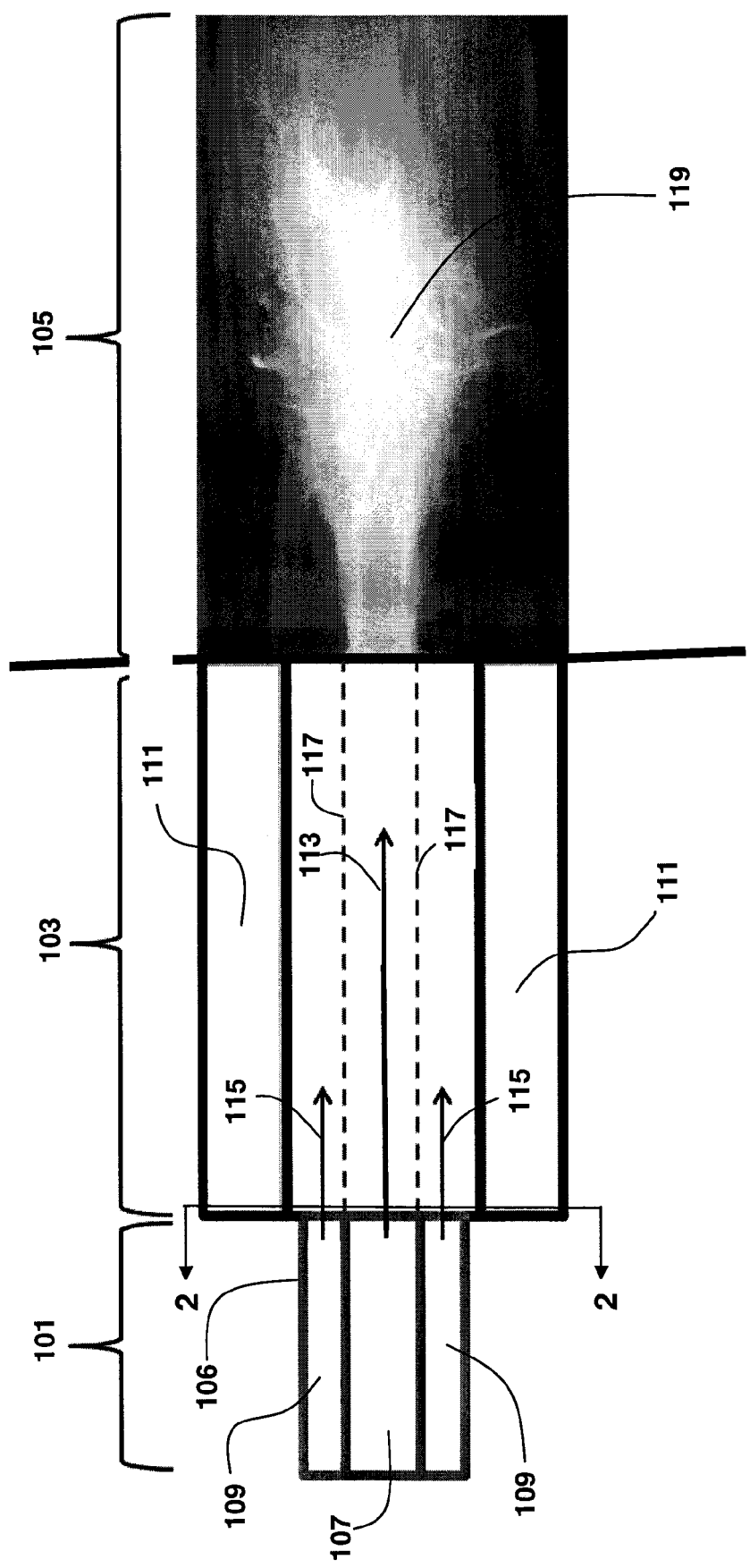
FIG. 1 is a schematic drawing illustrating an embodiment of a combustion system according to the present disclosure.

The present disclosure now will be described more fully hereinafter with reference to the accompanying drawings, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

As used herein, the term "oxygen" and grammatical variations thereof refers to an oxidizer having an $O_2$ concentration greater than that of atmospheric or ambient conditions. Although various embodiments illustrate flames in particular locations, it will be appreciated that flames may be present, but not necessarily required to be present, in any place where combustion occurs.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The terms "burner arrangement" and "burner" are equivalent and define an apparatus of assembled parts for the combustion of a pre-mixture fuel with oxygen. The term "pre-combustion zone" is defined as an enclosed space such as a space defined by a burner block that receives gas streams for combustion. The term "combustion zone" is defined as an enclosed space such as a furnace, downstream from the pre-combustion zone, in which combustion reactions occur, at least one of which may be the reaction of a carbon and/or hydrogen-containing fuel with oxygen to form carbon oxides and/or water and heat.

The instant invention provides a premix burner arrangement and method for achieving higher levels of oxygen enrichment by controlling the mixing between the air-fuel premix portion of the flame and oxygen injection.

In one aspect of the invention, oxygen is introduced through an annular space around the air-fuel premix flame wherein the oxygen velocity is lower than the premix air-fuel flame. While any suitable oxygen velocity can be employed, a suitable velocity range is determined by the following equation:

$$V_{O2}/V_{premix} \leq 1.0$$

where $V_{O2}$ is the velocity of second gas stream containing oxygen at the point of injection. $V_{premix}$ is the velocity of the first gas stream at the point of injection. In another embodiment, a preferred velocity range is determined by the following equation:

$$V_{O2}/V_{premix} \leq 0.5$$

Other ratios may include velocity ratios of between about 0.5 to about 1.0. Greater velocity ratios according to the above equation result in higher temperatures for the resultant flame and burner components, such as the burner nozzles and burner block.

In another aspect of the invention, oxygen enrichment is achieved by external lancing in the vicinity of the premix flame (e.g., an oxygen lance is located adjacent to the burner). External lancing can be a safer method of introducing oxygen, however, it requires additional ports in the furnace and the effect on flame is reduced due to the downstream injection point. If desired, external oxygen lancing can be combined with oxygen introduced into the annular space around the air-fuel premix.

FIG. 1 shows a schematic illustration of a premix burner arrangement 100. The premix burner arrangement 100 includes burner nozzle section 101, a precombustion zone 103 and a combustion zone 105. The burner nozzle section 101 includes burner nozzles 106, including a first conduit 107 and a second conduit 109 circumferentially disposed around the first conduit 107. The second conduit 109 may be a single continuous conduit or opening or may be a plurality of conduits, nozzles, or orifices. The precombustion zone 103 is defined by burner block 111 and receives a first gas stream 113 and a second gas stream 115 from the first and second conduits 107, 109. Burner block 111 is preferably a refractory material and may include a cylindrical geometry, but is not so limited and may have any suitable geometry for receiving gas streams from burner nozzle section 101.

The burner nozzle section 101 provides a first gas stream 113 and a second gas stream 115 to the precombustion zone 103. The first gas stream 113 is a pre-mixture of air and a combustible gas. The combustible gas is any suitable fuel capable of pre-mixing with air prior to combustion. Suitable combustible gas include, but are not limited to, gaseous hydrocarbon, such as natural gas or propane, CO, hydrogen-containing gas, such as gas having less than 50 vol % hydrogen and combinations thereof. The hydrogen-containing gas preferably includes less than about 50 vol % hydrogen due to the high flame speed of high concentration hydrogen in air. The pre-mixture of air and combustible gas may be provided in any manner known in the art. Suitable sources of the premixture of combustible gas and air are streams that are premixed some distance from the first conduit 107, usually in a central premixing chamber. The premix gas is then transported to individual burners and into their fuel conduits, such as the first conduit 107. The second gas stream 115 is an oxygen-containing gas having oxygen concentrations ranging from greater than 20.9 vol % (air) to greater than 99.5 vol % (high purity oxygen). The oxygen-containing gas preferably includes greater than about 50 vol % oxygen.

The first gas stream 113 and the second gas stream 115 are provided such that mixing of the first gas stream 113 and the second gas stream 115 are inhibited. By "inhibited mixing", "to inhibit mixing" and grammatical variations thereof, it is meant that the first gas stream 113 and the second gas stream 115 have limited mixing for a distance within the precombustion zone sufficient to prevent the overheating of the burner block 111 or other components of the burner arrangement 100. Overheating of components includes exposure to temperatures significantly higher than the temperature of an air-fuel flame. The temperatures that result in overheating are sufficiently high that, for example, exposure to these temperatures could damage or melt the refractory material of the burner block 111 or the other components of the burner arrangement 100. As shown in FIG. 1, the contact area 117 depicted by a broken line shows schematically the area in which the first gas stream 113 and the second gas stream 115 come in contact. It is understood that the contact area 117 is merely schematic and can vary based on the conditions within the precombustion zone 103.

In one embodiment, the mixing is inhibited by providing the first gas stream 113 and the second gas stream 115 at a velocity ratio of the second gas stream 115 to the first gas stream 113 sufficiently low to inhibit mixing, for example, through the precombustion zone 103. In another embodiment, the velocity ratio of the second gas stream 115 to the first gas stream 113 is less than about 1.0 or from about 0.5 to about 1.0, or less than about 0.5 or from about 0.1 to about 0.5 or any range or sub-range therein.

The first gas stream 113 is a premixture of air and combustible gas that is self-reactive or self-flammable. By self-reactive or self-flammable it is meant that the gas is capable of reacting, sustaining a flame or combustion in the absence of additional reactants. In addition, during operation, the burner arrangement 100 provides the first stream 113 such that the premixture is reacting or combusting and is at a temperature at least 1000° F. greater than the second stream. The 1000° F. or greater temperature difference between the first gas stream 113 and the second gas stream 115 causes a significant viscosity difference, where the hotter first gas stream is of much higher viscosity than the second gas stream. The velocity ratio of the second gas stream to the first gas stream is sufficiently low to inhibit mixing of the higher viscosity first gas stream with the lower viscosity second gas stream.

From the precombustion zone 103, the first gas stream 113 and the second gas stream 115 are provided to the combustion zone 105 where a flame 119 is created. A source of ignition (not shown) is provided to initiate the combustion and form the flame 119. The flame 119 is not limited to the geometry or the position shown and includes combustion of the pre-mixture of the first gas stream 113 with the oxygen of the second gas stream 115.

While not wishing to be bound by theory, it is believed that the inhibited mixing is a result of the differences in the physical states (e.g., temperature, velocity and viscosity) of the first gas stream 113 and the second gas stream 115. For example, the pre-mixture of combustible gas and air in the first gas stream 113 is generally in the state of combustion wherein the temperature is high relative to ambient. The second gas stream 115 is provided, for example, at about room temperature substantially below the temperature of the first gas stream 113. The states of two streams (1. first gas stream 113 and 2. second gas stream 115) are notably different, where the hotter reactant (air-fuel premix) is characterized by much higher viscosity and the colder (i.e., stream containing oxygen) is of much lower viscosity. Introduction of oxygen at high velocity would compensate for the viscosity difference and will result in relatively rapid mixing. However, by injecting oxygen at lower velocities than the air-fuel premix results in inhibited mixing, for example, at least until the gas streams exit the precombustion zone 103. This inhibited mixing results in much lower overall flame temperatures and enables the O2-enriched flame to travel through the precombustor without overheating the refractory walls.

Figure 2:
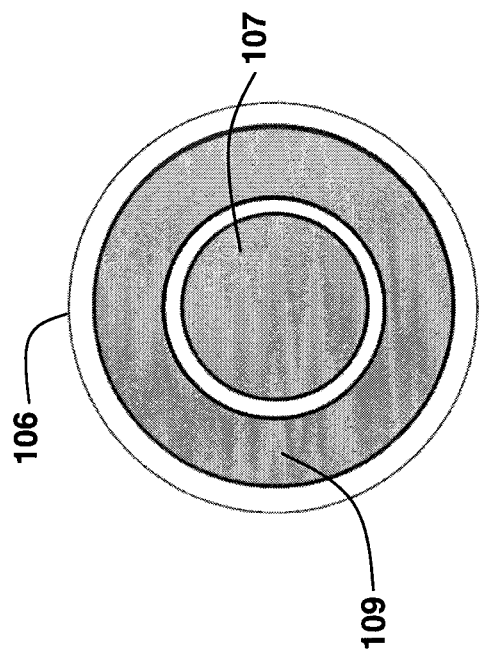
FIG. 2 is a schematic drawing illustrating a burner arrangement viewed in direction 2-2 of FIG. 1.

FIG. 2 illustrates a configuration of burner nozzles 106 shown in direction 2-2 from FIG. 1 according to an embodiment of the present disclosure. In this embodiment, the burner nozzles 106 are an annular type burner. The first conduit 107, which provides the first gas stream 113, is surrounded by a continuos second conduit 109 that provides the second gas stream 115 including oxygen.

Figure 3:
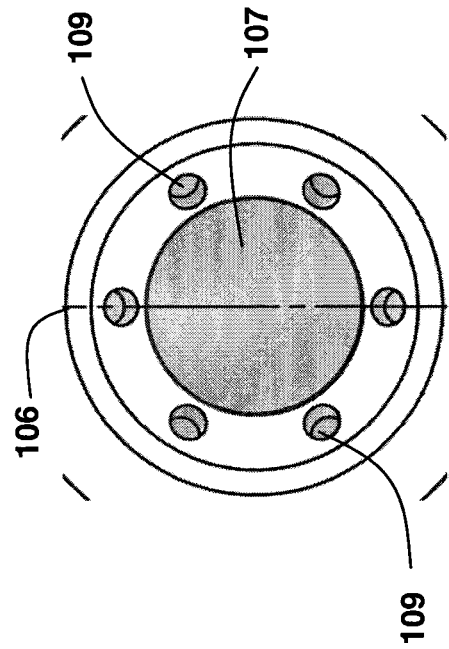
FIG. 3 is a schematic drawing illustrating an alternate burner arrangement viewed in direction 2-2 of FIG. 1.

FIG. 3 shows a schematic illustration of a multi-jet burner nozzle shown in direction 2-2 from FIG. 1. In this embodiment, the burner nozzles 106 are a multi-jet burner arrangement. The arrangement shown in FIG. 3 includes a central first conduit 107, which provides the first gas stream 113, containing a premix of air and combustible gas. The first conduit 107 is surrounded by a second conduit 109, which are a plurality of relatively small jets, conduits, nozzles or orifices that provide the second gas stream 115 including oxygen.

The burners of FIGS. 2 and 3 were evaluated in order to determine the velocity ratio of oxygen to premix. Referring now to Table 1 below, Table 1 lists the Velocity Ratio $V_{O2}/V_{premix}$ for the annular burner (arrangement shown in FIG. 2) and multi-jet burner (arrangement shown in FIG. 3).

TABLE 1

| $O_2$ in Oxidizer, % | Multi-jet mode Velocity Ratio, $V_{O2}/V_{premix}$ | Annular mode Velocity Ratio, $V_{O2}/V_{premix}$ |
|---|---|---|
| 20.8 | 0.000 | 0.000 |
| 21.3 | 0.036 | 0.003 |
| 25.9 | 0.357 | 0.031 |
| 30.4 | 0.714 | 0.063 |
| 34.4 | 1.072 | 0.094 |
| 44.1 | 2.143 | 0.189 |
| 51.2 | 3.215 | 0.283 |

Figure 4:
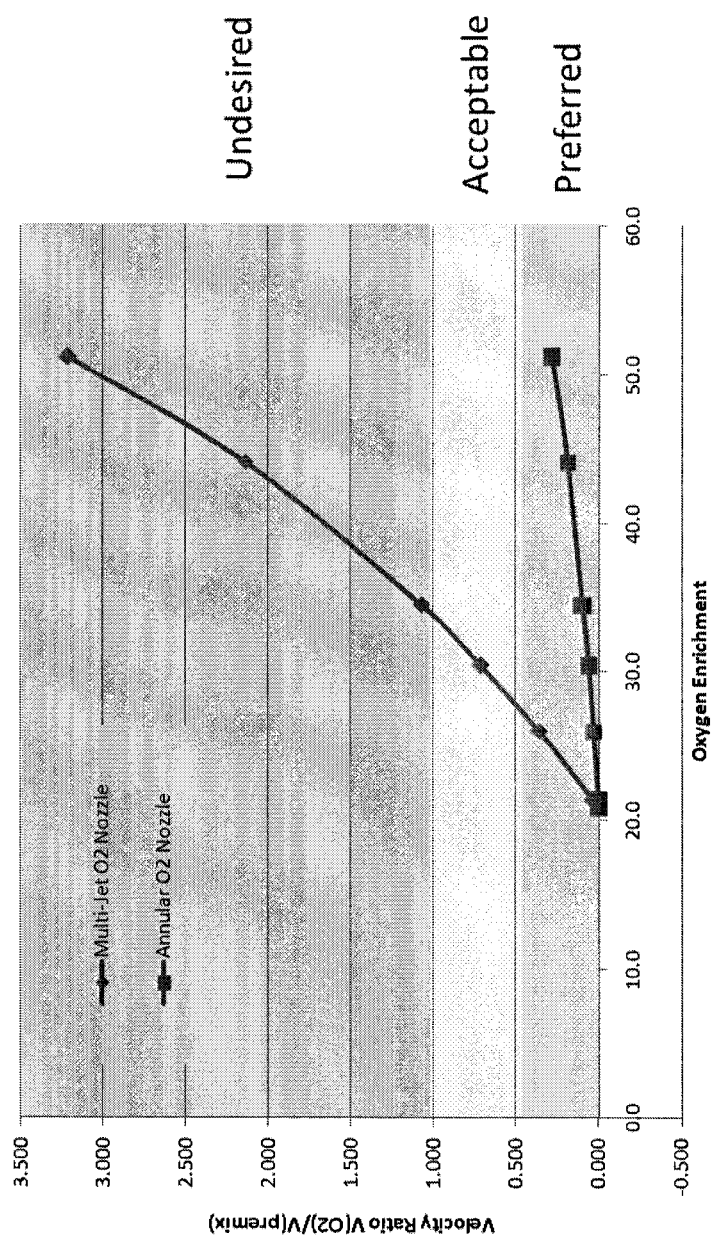
FIG. 4 is a graphical representation of velocity ratios as a function of oxygen enrichment.

Referring now to FIG. 4, it illustrates the velocity ratios for the multi-jet and annular burners as a function of oxygen enrichment. FIG. 4 also illustrates that desirable results can be achieved by using a velocity ratio of less than about 0.5 and in some cases the ratio can range from about 0.5 to about 1.0. Table 1 and FIG. 4 also illustrate that the oxygen enrichment can be controlled to obtain a desired pre-determined amount of enrichment. That is, higher levels of oxygen enrichment can be achieved by controlling the mixing between the air-fuel premix portion of the flame and oxygen injection.

The inventive burner arrangement and method can be employed in a wide range of furnaces. Examples of such furnaces include those employed for industrial heating such as cement, glass and metal treatment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A premix burner arrangement comprising:
   a first conduit arranged and disposed to provide a first gas stream, the first gas stream being a self-reactive or self-flammable premixture comprising air and a combustible gas; and
   at least one second conduit arranged and disposed to provide a second gas stream circumferentially around the first gas stream, the second gas stream including oxygen;
   wherein the premix burner arrangement is configured to combust or react the first stream at a temperature at least 1000° F. greater than the temperature of the second stream, the premix burner arrangement further being configured to provide a velocity ratio of the second gas stream to the first gas stream sufficiently low to inhibit mixing of the first gas stream with the second gas stream.

2. The burner arrangement of claim 1, wherein the at least one second conduit comprises a concentric conduit that surrounds the first conduit.

3. The burner arrangement of claim 1, wherein the at least one second conduit includes a series of multiple nozzles or orifices that are arranged around the first conduit.

4. The burner arrangement of claim 1, wherein the velocity ratio of the second gas stream to the first gas stream is less than about 1.0.

5. The burner arrangement of claim 1, wherein the velocity ratio of the second gas stream to the first gas stream is less than about 0.5.

6. The burner arrangement of claim 1, wherein the velocity ratio of the second gas stream to the first gas stream is from about 0.1 to about 0.5.

7. The burner arrangement of claim 1, wherein the combustible gas is selected from the group consisting of gaseous hydrocarbon, CO, hydrogen-containing gas, and combinations thereof.

8. The burner arrangement of claim 1, wherein the second gas stream includes oxygen in a concentration greater than about 50 vol %.

9. A combustion method comprising:
   providing a first gas stream, the first gas stream being a self-reactive or self-flammable pre-mixture comprising air and a combustible gas in a first conduit; and
   providing a second gas stream circumferentially around the first gas stream with at least one second conduit, the second gas stream including oxygen;
   wherein the first stream is reacting or combusting and is at a temperature at least 1000° F. higher than the second stream and the first gas stream and second gas stream are provided with a velocity ratio of the second gas stream to the first gas stream sufficiently low to inhibit mixing of the first gas stream with the second gas stream.

10. The method of claim 9, wherein the velocity ratio of the second gas stream to the first gas stream is less than about 1.0.

11. The method of claim 9, wherein the velocity ratio of the second gas stream to the first gas stream is less than about 0.5.

12. The method of claim 9, wherein the velocity ratio of the second gas stream to the first gas stream is from about 0.1 to about 0.5.

13. The method of claim 9, the combustible gas is selected from the group consisting of gaseous hydrocarbon, CO, hydrogen-containing gas, and combinations thereof.

14. The method of claim 9, wherein the second gas stream includes oxygen in a concentration greater than about 50 vol %.

15. A combustion system comprising:
   a premix burner arrangement having a first conduit and at least one second conduit, the first conduit being arranged and disposed to provide a first gas stream, the first gas stream being a self-reactive or self-flammable pre-mixture comprising air and a combustible gas and the at least one second conduit being arranged and disposed to provide a second gas stream including oxygen circumferentially around the first gas stream; and
   a burner block forming a precombustion zone configured to receive the first gas stream and the second gas stream;
   wherein the premix burner arrangement is configured to combust or react the first stream at a temperature at least 1000° F. greater than the temperature of the second stream, the premix burner arrangement further being configured to provide a velocity ratio of the second gas stream to the first gas stream sufficiently low to inhibit mixing of the first gas stream with the second gas stream.

16. The system of claim 15, wherein the velocity ratio of the second gas stream to the first gas stream is less than about 1.0.

17. The system of claim 15, wherein the velocity ratio of the second gas stream to the first gas stream is less than about 0.5.

18. The system of claim 15, wherein the velocity ratio of the second gas stream to the first gas stream is from about 0.1 to about 0.5.

19. The system of claim 15, wherein the combustible gas is selected from the group consisting of gaseous hydrocarbon, CO, hydrogen-containing gas, and combinations thereof.

20. The system of claim 15, wherein the second gas stream includes oxygen in a concentration greater than about 50 vol %.

* * * * *